United States Patent
Yokokura (10) Patent No.: US 7,584,246 B2
(45) Date of Patent: Sep. 1, 2009

(54) MULTIFUNCTIONAL NETWORK DEVICE AND A NETWORK SYSTEM

(75) Inventor: Hidenori Yokokura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/270,566

(22) Filed: Nov. 10, 2005

(65) Prior Publication Data
US 2006/0069725 A1    Mar. 30, 2006

Related U.S. Application Data

(62) Division of application No. 09/892,875, filed on Jun. 28, 2001, now Pat. No. 6,993,558.

(30) Foreign Application Priority Data
Jun. 30, 2000 (JP) .............................. 2000-200232

(51) Int. Cl.
*G06F 15/16* (2006.01)
(52) U.S. Cl. ...................... 709/203; 709/249; 709/250; 715/736; 358/1.12; 358/1.15
(58) Field of Classification Search ................. 709/203, 709/223, 224, 249–250, 222; 710/8; 715/736; 358/1.12, 1.15
See application file for complete search history.

(56) References Cited

U.S. PATENT DOCUMENTS

| | | | |
|---|---|---|---|
| 5,935,217 A * | 8/1999 | Sakai et al. .................. 709/249 |
| 6,167,449 A | 12/2000 | Arnold et al. ................ 709/227 |
| 6,553,431 B1 * | 4/2003 | Yamamoto et al. ............. 710/8 |
| 6,591,297 B1 * | 7/2003 | Challener et al. ............ 709/224 |
| 7,065,564 B2 * | 6/2006 | Machida ..................... 709/222 |
| 7,167,909 B2 * | 1/2007 | Yamamoto ................... 709/223 |
| 2002/0138564 A1 * | 9/2002 | Treptow et al. ............. 709/203 |

\* cited by examiner

*Primary Examiner*—Thu Ha T Nguyen
(74) *Attorney, Agent, or Firm*—Fitzpatrick, Cella, Harper & Scinto (57) ABSTRACT

There is disclosed a network device in a network system connected to a directory server and a plurality of network devices, in which a combined function is generated utilizing two or more functions out of a plurality of functions able to be provided by a first network device constituting the plurality of network devices, and the generated combined function is registered in the directory server.

7 Claims, 6 Drawing Sheets

DIRECTORY INFO 50

| DEVICE NAME 51 | NETWORK ADDRESS 52 | SERVICE TYPE 53 | ATTRIBUTE 1 (SCOPE) 54 | ATTRIBUTE 2 (LOCATION) 55 | ATTRIBUTE 3 (PAPER SIZE) 56 | ATTRIBUTE 4 (OPTION) 57 | ATTRIBUTE 5 (DEVICE STATUS) 58 |
|---|---|---|---|---|---|---|---|
| DIRECTORY SERVER | SERVICE: DIR-SVR.ABCD.CO.JP | DIRECTORY-AGENT | ALL | 2FLOOR A | NONE | HD | ACTIVE |
| MR. COLOR | SERVICE: PRN-CLOR.ABCD.CO.JP | PRINTER | DEVELOP | 2FLOOR A | A4 | CASSETTE | READY |
| 2F HIGH-SPEED | SERVICE: PRN-MFP.ABCD.CO.JP | PRINTER | USER | 2FLOOR B | A4, A3 | SORTER FINISHER | READY |
| 2F HIGH-SPEED | SERVICE: PRN-MFP.ABCD.CO.JP | SCANNER | USER | 2FLOOR B | A4, A3 | NONE | READY |
| 2F HIGH-SPEED | SERVICE: PRN-MFP.ABCD.CO.JP | FAX | USER | 2FLOOR B | A4, A3 | NONE | READY |
| 2F HIGH-SPEED | SERVICE: PRN-MFP.ABCD.CO.JP | PRINTER& SCAN | DEVELOP | 2FLOOR B | A4, A3 | SORTER FINISHER | READY |
| DEVELOP FAX | SERVICE: FAX-MONO.ABCD.CO.JP | FAX | DEVELOP | 2FLOOR C | A4, A3 | NONE | READY |
| DEVELOP PRINTER | SERVICE: PRN-MONO.ABCD.CO.JP | PRINTER | DEVELOP | 2FLOOR D | A4 | CASSETTE | BUSY |
| SNMP ADMIN | SERVICE: ADMIN.ABCD.CO.JP | SNMP | ALL | 2FLOOR B | NONE | NONE | ACTIVE |
| 1F PRINTER & SCAN | 192.168.16.104 192.168.16.105 | PRINTER& SCAN | USER | 1FLOOR A | A4 | SORTER | READY |
| 1F PRINTER | 192.168.16.104 | PRINTER | USER | 1FLOOR A | A4 | SORTER | READY |
| SCANNER | 192.168.16.105 | SCANNER | ALL | 1FLOOR A | A4, A3 | NONE | READY |
| ...... | ...... | ...... | ...... | ...... | ...... | ...... | ...... |

MULTIFUNCTIONAL NETWORK DEVICE AND A NETWORK SYSTEM

CROSS REFERENCE TO RELATED APPLICATION

This application is a division of application Ser. No. 09/892,875, filed Jun. 28, 2001, the entire disclosure of which is incorporated herein by reference.

BACKGROUND OF THE INVENTION

1. Field of the Invention

The present invention relates to a network device, directory server and network system.

2. Related Background Art

In recent years, a network system connected to a directory server, various personal computers (PC) and a plurality of devices has spread. In this network system, a print function and other information of the device connected to the network, and information indicating a location where the device is installed are registered beforehand in the directory server. Then, the information of the function, installation location, and the like of the device registered in the directory server can be searched on the PC. Moreover, a function of searching for the information of the function, installation location, and the like of the device registered in the directory server on the PC is called a directory service.

For example, a user uses the directory service to search for the device having a print function among the devices connected to the network. In this case, information for searching for the device having the print function is inputted into the PC on which the information can be searched. Then, a list of devices which have the print function and which can be utilized in the network system is displayed in a screen of the PC.

For example, the network system is constructed in a three-storied building, and among a plurality of devices connected to the network, a distance between the device installed on a first floor and the device installed on a third floor is relatively long.

In this case, it is assumed that scanners exist on the third, second and first floors, and a printer exists on the first floor. These three scanners and one printer are devices which can be utilized in the network system. When the user uses the directory service to search for the scanner and printer for performing copying in the network system, the three scanners and one printer able to be utilized in the network system are displayed in the PC screen.

Additionally, when the scanner and printer are used to perform the copying, and a distance between these two devices is short, a combination of these scanner and printer can easily be used.

As described above, when the list of three scanners and one printer is displayed in the PC screen, the user searches for the combination. In this case, the user has to visually search for the combination from the list, and there is a problem that a searching operation is intricate.

SUMMARY OF THE INVENTION

An object of the present invention is to provide a network device and network system in which a user can quickly search for a combination of one function and another function in the network system connected to a directory server and a plurality of devices.

To achieve the object, there is provided a network device for generating a combined function utilizing two or more functions out of a plurality of functions able to be provided by a first network device constituting a plurality of network devices, and registering the generated combined function in a directory server in a network system connected to the directory server and the plurality of network devices.

DETAILED DESCRIPTION OF THE PREFERRED EMBODIMENTS

A preferred embodiment of the present invention will be described hereinafter with reference to the drawings.

Figure 1:
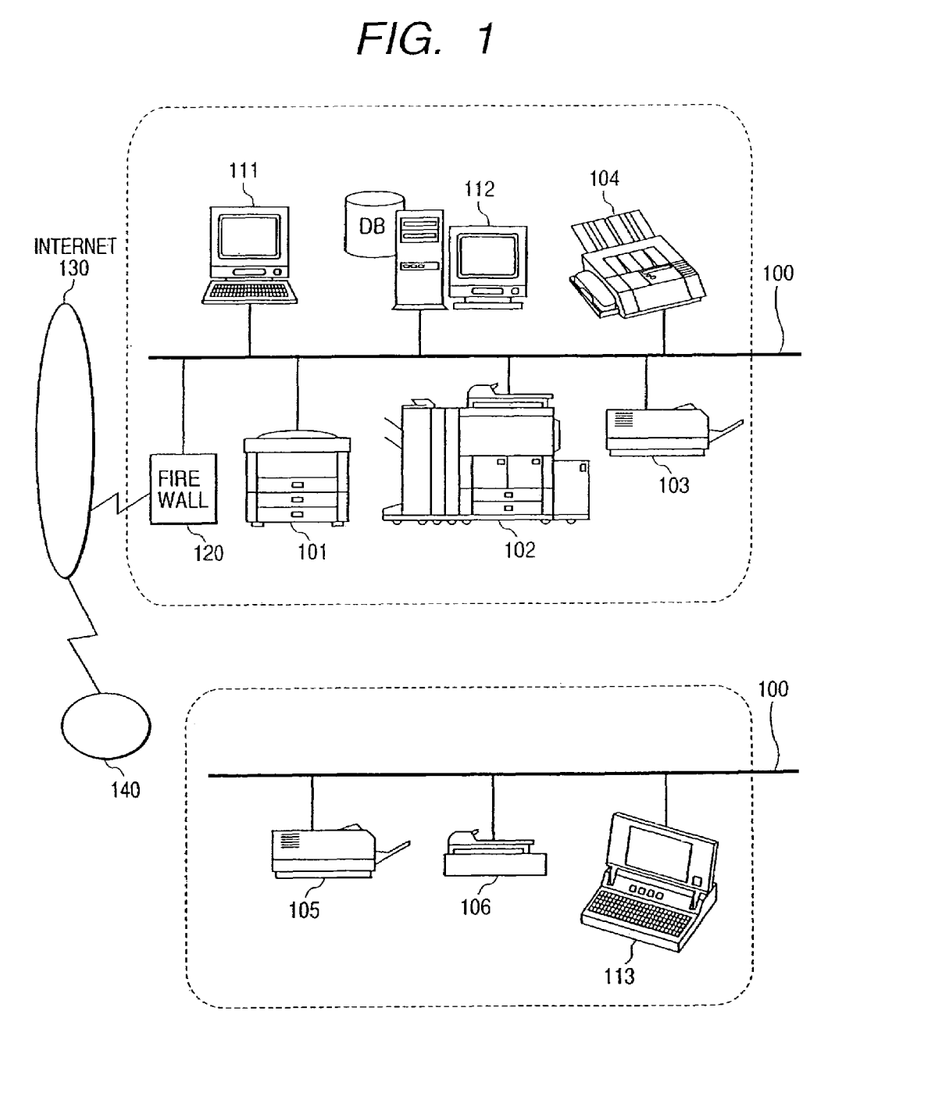
FIG. 1 is a block diagram showing a constitution of a network system NS1 according to one embodiment of the present invention.

FIG. 1 is a block diagram showing a constitution of a network system NS1 according to one embodiment of the present invention.

The network system NS1 includes a LAN 100, color printer 101, multifunction peripheral (MFP) 102, monochromatic printers 103, 105, facsimile machine 104, scanner 106, desk top PC 111, network device search server 112, notebook-size PC 113, and fire wall 120.

The MFP 102 is a copying machine having print, scan and facsimile functions, and can also be used as a network system printer.

Additionally, the color printer 101, MFP 102, monochromatic printers 103, 105, facsimile machine 104, and scanner 106 are called network devices connected to a network.

Moreover, information on the network devices 101 to 106, such as the functions of the network devices and locations where the network devices are installed are registered in the network device search server 112.

Moreover, the network device search server 112 is a server in which service information of services corresponding to the print, scan and other functions of the network devices 101 to 106 is stored.

The desk top PC 111 and notebook-size PC 113 are search clients which can search for the network devices 101 to 106 registered in the network device search server 112.

When the network device search server 112 receives information of inquiry for searching for the network device, outputted by the desk top PC 111 or the notebook-size PC 113, the server returns information of a search result for the inquiry to the PC having outputted the inquiry information. Moreover, the PC having received the search result information displays an image based on the search result information.

The LAN 100 connects the network devices 101 to 106, desk top PC 111, network device search server 112, and notebook-size PC 113 to one another, and is connected to Internet 130 via the fire wall 120. Furthermore, the LAN 100 is connected to another network 140 via Internet 130. Additionally, the firewall 120 is an information wall for preventing illegal information from invading the network system NS1 from the outside of the network system NS1.

Figure 2:
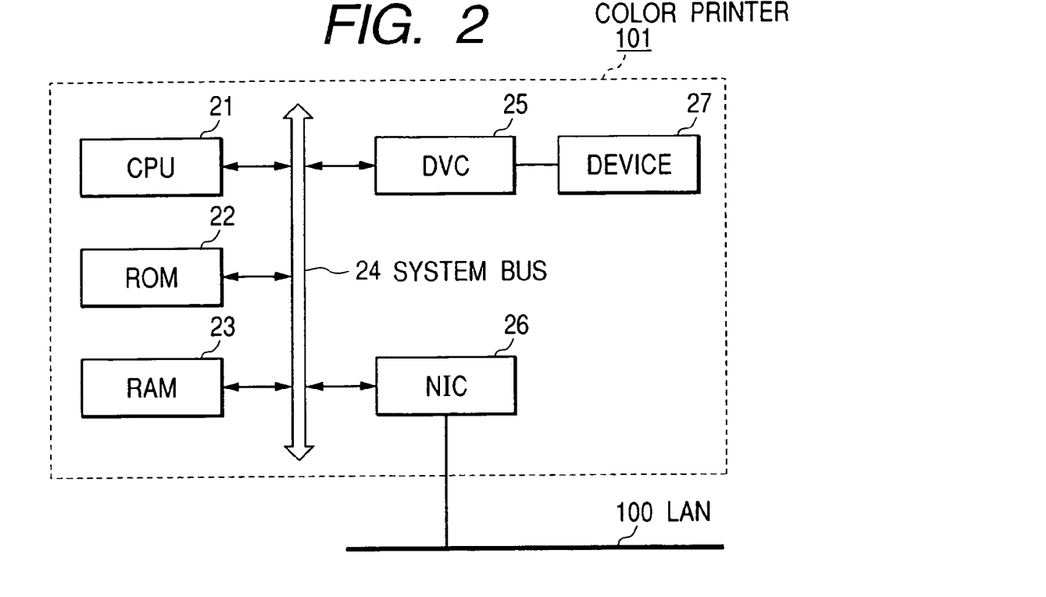
FIG. 2 is a block diagram showing an internal constitution of a color printer 101 among network devices shown in FIG. 1.

FIG. 2 is a block diagram showing an internal constitution of the color printer 101 among the network devices shown in FIG. 1.

The color printer 101 is a network device which outputs information of a service corresponding to its own color print function to the network device search server 112, and in which a network device information registration program for registering the service information into the network device search server 112 operates.

The color printer 101 includes a CPU 21, ROM 22, RAM 23, system bus 24, device controller (DVC) 25, network interface card (NIC) 26, and color printer device 27.

The CPU 21 executes a program stored in the ROM 22, and generally controls the respective devices connected to the system bus 24. The RAM 23 is a memory which serves as a main memory, work area, and the like of the CPU 21. The DVC 25 controls the color printer device 27. The NIC 26 bidirectionally exchanges data with the network devices 102 to 106, desk top PC 111, network device search server 112, and notebook-size PC 113 via the LAM 100. The color printer device 27 has a color print function.

Additionally, network device internal constitutions of the MFP 102, monochromatic printers 103, 105, facsimile machine 104, and scanner 106 shown in FIG. 1 are substantially similar to the constitution of the color printer 101 excluding the color printer device 27.

Figure 3:
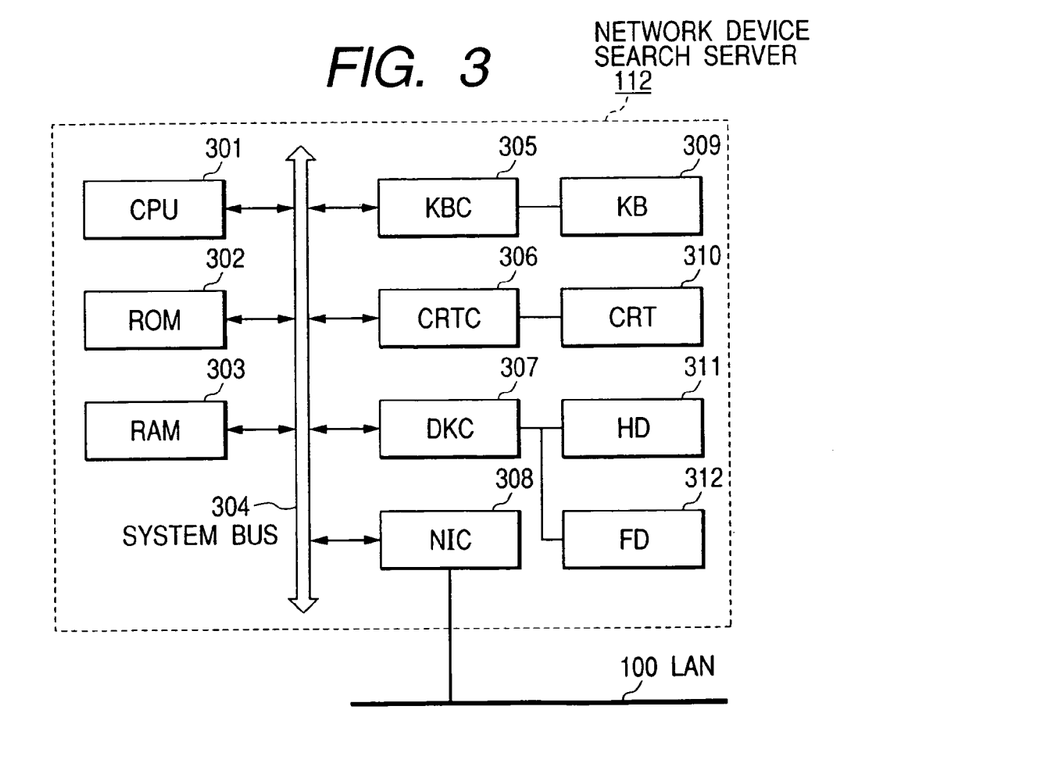
FIG. 3 is a block diagram showing an internal constitution of a network device search server 112.

FIG. 3 is a block diagram showing an internal constitution of the network device search server 112.

Additionally, internal constitutions of the desk top PC 111 and notebook-size PC 113 shown in FIG. 1 are substantially similar to the constitution of the network device search server 112.

The network device search server 112 is a PC on which a network device search client software and network device search server software operate (these two types of software will hereinafter be referred to collectively as "network device search software"). The network device search software has a function of registering information on the device connected to the network into the network device search server, and searching for the information on the device registered in the network device search server.

The network device search server 112 includes a CPU 301, ROM 302, RAM 303, system bus 304, keyboard controller (KBC) 305, CRT controller (CRTC) 306, disk controller (PKC) 307, network interface card (NIC) 308, keyboard (KB) 309, CRT display (CRT) 310, hard disk (HD) 311, and floppy disk controller (FD) 312.

The CPU 301 executes the network device search software stored in the ROM 302 or the HD 311, and generally controls the respective devices connected to the system bus 304. Additionally, the CPU 301 may execute the network device search software supplied from the FD 312.

The HD 311 is a memory in which the information on the network devices 101 to 106 is stored.

The RAM 303 is a memory which serves as the main memory, work area, and the like of the CPU 301. The KBC 305 controls input information inputted via the KB 309 or a pointing device (not shown). The CRTC 306 controls display of the CRT 310. The DKC 307 controls an access to the HD 311 or the FD 312 in which a boot program, various applications, edition file, user file, network management program, and the like are stored. The NIC 308 bidirectionally exchanges the data with the network devices 101 to 106, desk top PC 111 and notebook-size PC 113 via the LAN 100.

Figure 4:
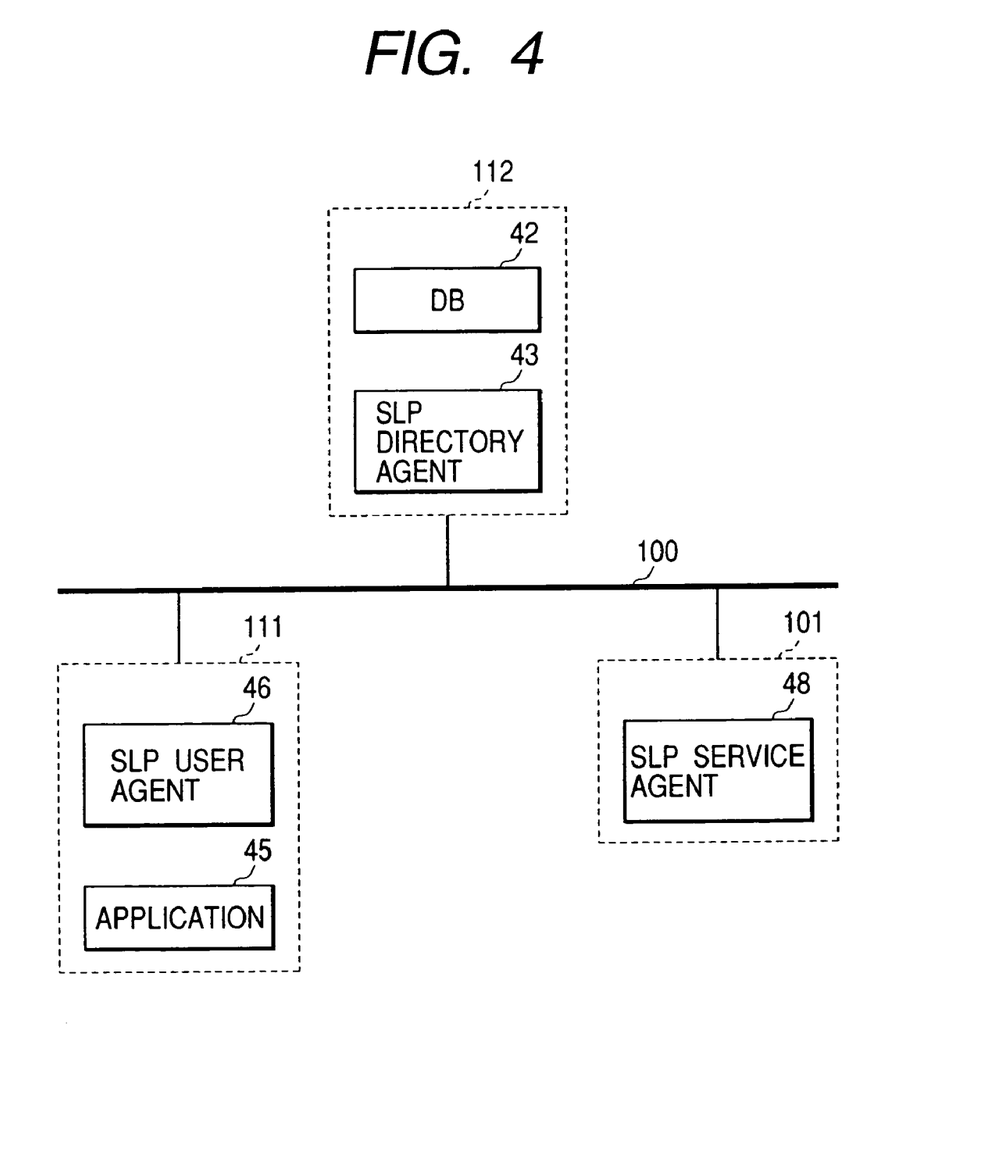
FIG. 4 is a diagram showing an example of a software constitution of a network device search system in the network system NS1.

FIG. 4 is a diagram showing an example of a software constitution of a network device search system in the network system NS1.

The network device search server 112 includes a database 42 and SLP directory agent 43. Moreover, the desk top PC 111 includes an application 45 and SLP user agent 46. Furthermore, the color printer 101 includes an SLP service agent 48.

An operation of the aforementioned embodiment will next be described.

Additionally, it is assumed in the embodiment that the network system NS1 is constructed in a two-storied building. In this building, the color printer 101, MFP 102, monochromatic printer 103, facsimile machine 104, desk top PC 111 and network device search server 112 are installed on the second floor, while the monochromatic printer 105, scanner 106 and notebook-size PC 113 are installed on the first floor. Moreover, a distance between the monochromatic printer 105 and the scanner 106 is relatively short, and the monochromatic printer 105 and scanner 106 are installed in the same location. Additionally, the notebook-size PC 113 can be disconnected from the LAN 100 during use.

Figure 5:
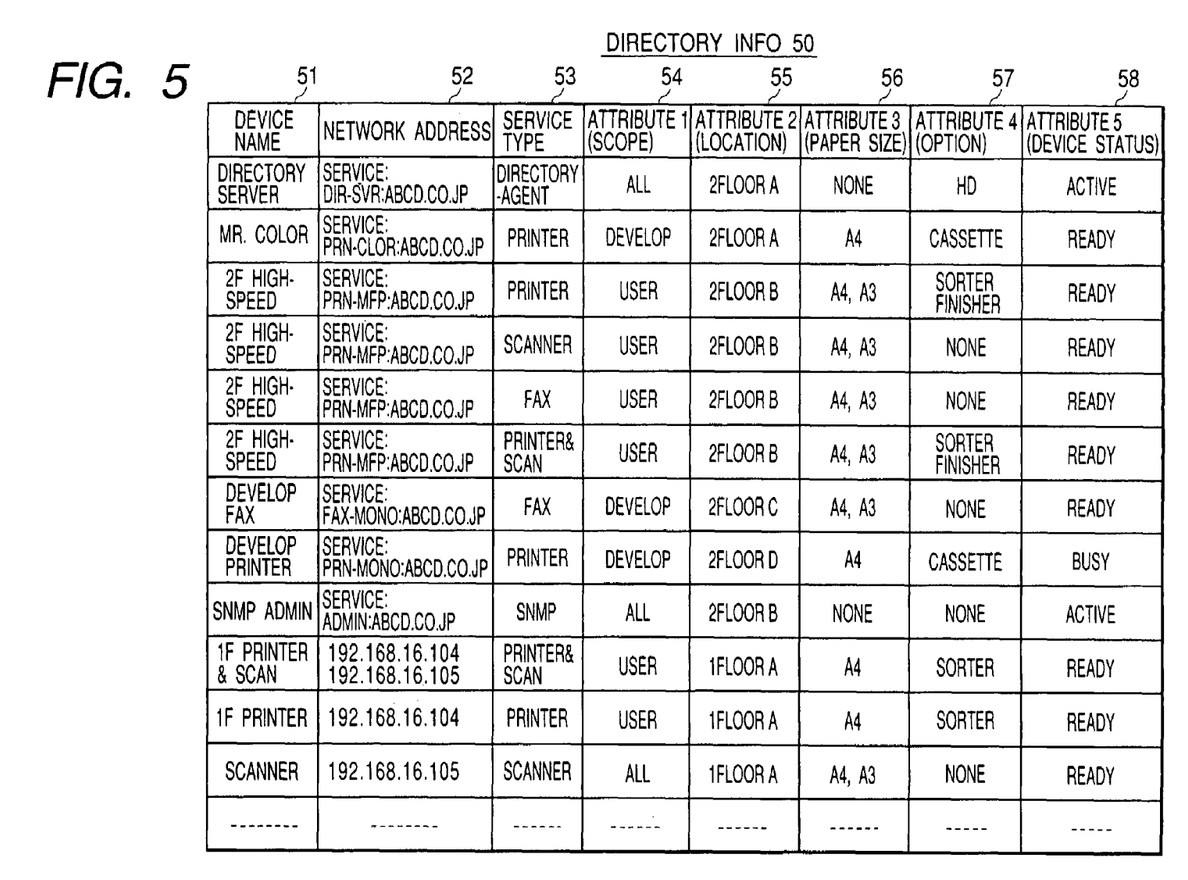
FIG. 5 is a diagram showing a content of registered information stored in HD 311 of the network device search server 112 in a table form.

FIG. 5 is a diagram showing a content of registered information stored in the HD 311 of the network device search server 112.

FIG. 5 shows the content of the registered information on the network devices 101 to 106.

Directory registration information 50 is constituted of: a device name 51; a network address 52 indicating a network device address; a service type 53 indicating a name of the service corresponding to the function of the network device; a scope 54 indicating an accessible level of the network device; a location 55 indicating the location where the network device is physically disposed; a paper size 56 indicating a paper size supported by the network device; an option 57 indicating optional functions of the network device, such as a sorter and stapler; and a device status 58 indicating a status of the network device.

Additionally, in the aforementioned embodiment, as shown in FIG. 5, "Directory Server" is registered as the name indicating the network device search server 112, "Mr. Color" is registered as the name of the color printer 101, "2F High-Speed" is registered as the name of the MFP 102, "Develop Printer" is registered as the name of the monochromatic printer 103, "Develop FAX" is registered as the name of the facsimile machine 104, "SNMP Admin" is registered as the name of the desk top PC 111, "1F Printer" is registered as the name of the monochromatic printer 105, and "Scanner" is registered as the name of the scanner 106.

Moreover, since the MFP 102 has three functions, that is, a print function, scan function and facsimile function, the MFP is registered as "2F High-Speed" having respective functions, that is, "2F High-Speed" having the print function, "2F High-Speed" having the scan function and "2F High-Speed" having the facsimile function in the network device search server 112.

Furthermore, since the MFP 102 also has a combination of the scan and print functions as a copy function, service name "print & scan" is registered in the network device search server 112.

In the aforementioned embodiment, the monochromatic printer 105 and scanner 106 exist in the same location, are separately registered as "1F Printer" and "Scanner" as described above, and are associated with each other and registered with a series of service names "print & scan" and the name "1F Printer and Scanner".

Figure 6:
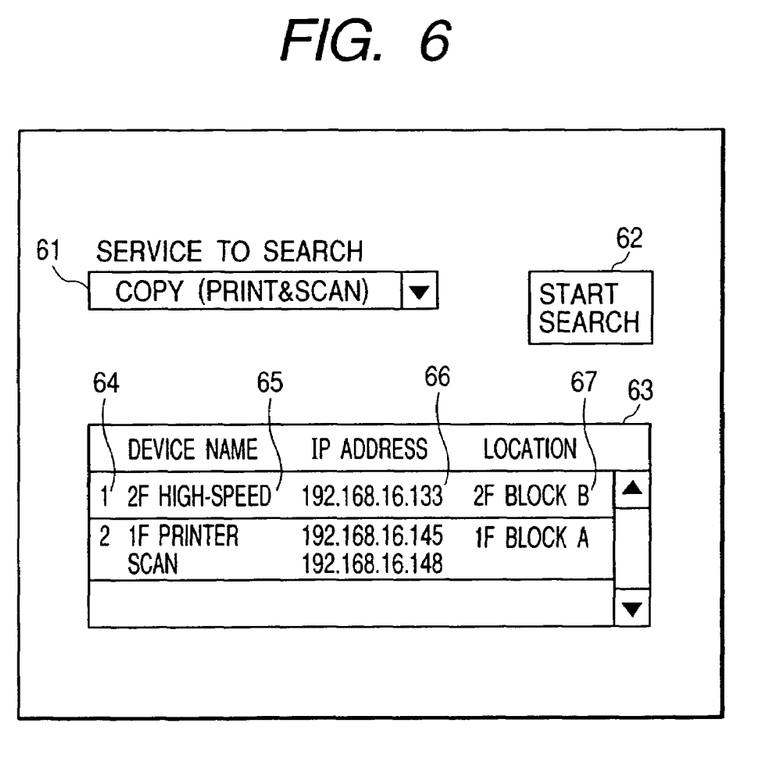
FIG. 6 is a diagram showing an example of a screen display displayed in CRT 310 during searching of network devices 101 to 106 in a desk top PC 111.

FIG. 6 is a diagram showing an example of a screen display displayed in the CRT 310 during searching of the network devices 101 to 106 in the desk top PC 111.

In the example of screen display shown in FIG. 6, the user searches the network devices 101 to 106 for the network device having the copy (print & scan) function in the desk top PC 111.

The user operates a mouse (pointing device) (not shown) connected to the desk top PC 111 to display the function to be searched such as a combined copy function (print & scan) in a search function 61, and selects a search start button 62, so that a search operation starts.

When the search operation ends, a searched result is displayed in a search result list 63. The search result list 63 is constituted of a number 64 indicating an identification number, name of the searched network device and name of a combined service 65, IP address 66, and location 67 indicating the location where the device is installed.

For example, when the copy (print & scan) is searched in the aforementioned embodiment, "2F High-Speed (MFP 102)" and "1F Printer (monochromatic printer 105) Scanner (scanner 106)" having the copy function (print & scan) are displayed in the search result list 63. In the aforementioned embodiment, the monochromatic printer 105 and scanner 106 exist in the same location on the first floor, and can be used to perform copying. Moreover, when the service names of two services corresponding to the print function of the monochromatic printer 105 and the scan function of the scanner 106 are regarded as a series of service names, "print & Scan" indicating the service name is registered in the network device search server 112. Therefore, when the copy (print & scan) is searched, "1F Printer Scanner" is displayed in the search result list 63.

Additionally, in the aforementioned embodiment, the desk top PC 111 is used to perform the searching, but the notebook-size PC 113 or the network device search server 112 may be used to perform the searching.

Figure 7:
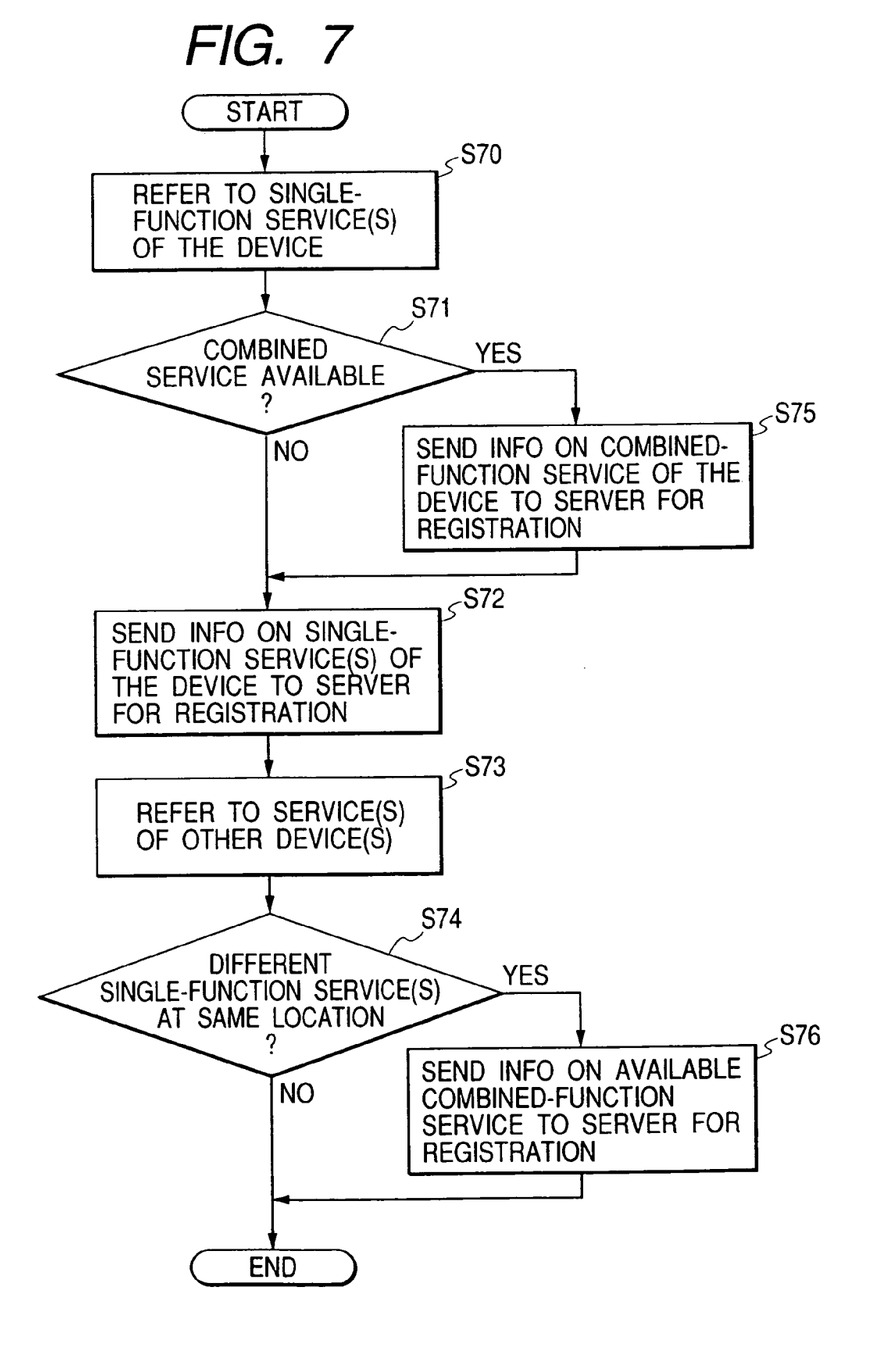
FIG. 7 is a flowchart showing an operation of the network devices 101 to 106 in the network system NS1 according to the embodiment.

FIG. 7 is a flowchart showing an operation of the network devices 101 to 106 in the network system NS1 according to the aforementioned embodiment.

When the network device is started, services of single-functions such as the print function, scan function, and FAX function of the device are referred to (S70). Subsequently, it is judged whether or not there are a plurality of single-function services referred to in the step S70 and a combined service of two or more single-functions is available (S71).

With an affirmative judgment in the step S71, information for registering information on the available combined service in the network device search server 112 is sent to the network device search server 112 and registered in the network device search server 112 (S75). Here, in the present embodiment, the sending of the registration information into the network device search server 112 is realized by SLP, but may be realized by other protocols such as LDAP.

For example, when the MFP 102 having three print, scan and FAX functions can provide the copy function of the combined scan and print functions as the combined service open to the public on the network, the "print & scan" service is registered.

Subsequently, the information for registering the single-function service of the device into the network device search server 112 is sent to the network device search server 112, and registered in the network device search server 112 (S72).

For example, for the MFP 102 having three single-functions of the print, scan and FAX functions, the print, scan and FAX functions are registered in the network device search server 112.

On the other hand, when the plurality of functions are not referred to in the step S70 (S71), the service name of the service corresponding to one function of the device is registered in the network device search server 112 (S72).

Subsequently, the functions of other network devices registered in the network device search server 112 are referred to (S73), and it is judged from the functions referred to the step S73 whether or not the other device having a different function exits in the same location (S74). If the device having the different function does not exist in the same location, the registration of the service name of the service corresponding to the function is ended.

When the other device having the single-function different from the single-function of the device exists in the same location (S74) and the combined service of the single-function service of the other network device present in the same location with the single-function service of the device is available, the information for registering the combined service into the network device search server 112 is sent to the network device search server 112. The series of service names are registered in the network device search server 112 (S76), and this processing ends.

For example, in the step S76, the monochromatic printer 105 registers the service name of the service corresponding to the function of the printer, and the service name of the service corresponding to the function of the scanner 106 into the network device search server 112. In this case, the monochromatic printer 105 and scanner 106 exist in the same location on the first floor of the building in which the network system NS1 is constructed. Therefore, when the print function of the monochromatic printer 105 can be combined with the scan function of the scanner 106 to realize remote copy, service name "print & scan" is registered in the network device search server 112.

Additionally, in the aforementioned embodiment, the user may judge whether or not the network device has a plurality of functions, and service names of a plurality of services corresponding to the plurality of functions of the network device may be registered as a series of service names in the network device search server 112. In this case, the user sends the information for registering the series of service names in the network device search server 112 to the network device search server 112 by a manual operation, so that the information is registered in the network device search server 112.

Moreover, in at least two or more devices connected to the LAN 100, the service names of the plurality of services corresponding to the functions of the two or more devices may be registered as the series of service names in the network device search server 112. In this case, the user sends the information for registering the series of service names in the network device search server 112 to the network device search server 112 by the manual operation, so that the information is registered in the network device search server 112.

According to the aforementioned embodiment, for example, when the user searches for the device having the copy function by the notebook-size PC 113 in order to perform the copying on the first floor, "2F High-Speed" and "1F Printer Scanner" are displayed in the screen of the notebook-size PC 113. In this case, the user on the first floor can instantly recognize that the user can perform the copying on the first floor, and can quickly search for the device to be utilized.

Moreover, according to the aforementioned embodiment, for example, when the copy (print & scan) is searched by the PC 111, the MFP 102 having three print, scan and facsimile functions is not separately displayed as the "2F High-Speed" having the print function and "2F High-Speed" having the scan function in the PC 111, but is displayed as "2F High-Speed" having three print, scan and facsimile functions in the screen of the PC 111. Therefore, it is instantly recognized that the user can use "2F High-Speed" to perform the copying, and the user can quickly search for the device to be utilized.

Additionally, in the network system of the aforementioned embodiment, the directory server and a plurality of network devices are connected to the LAN, but the aforementioned embodiment may be applied to the network system in which the directory server and the plurality of network devices are connected to the network other than LAN.

According to the present invention, an effect can be produced that the user can quickly search for a combination of one function with another function in the network system connected to the network device search server and the plurality of devices.

What is claimed is:

1. An image forming apparatus connected to a network, the apparatus comprising:
    a processor and a memory unit coupled to said processor;
    a reception unit constructed to receive service information provided by a second image forming apparatus which includes location information indicating a location of the second image forming apparatus registered in a server apparatus;
    a determination unit configured to determine whether the location of the second image forming apparatus and a location of said image forming apparatus are identical to each other, based on the location information received by said reception unit; and
    a transmission unit constructed to transmit, via the network, without waiting for a request from the server apparatus, the service information received by said reception unit and service information indicating a service that said image forming apparatus can provide to the server apparatus such that the service information for the second image forming apparatus and the service information for said image forming apparatus are related with each other and registered in the server apparatus, if said determination unit determines that the location of the second image forming apparatus indicated by the received location information and the location of said image forming apparatus are identical to each other,
    wherein said transmission unit does not transmit, via the network, the service information received and the service information indicating the service, if said determination unit determines that the location of the second image forming apparatus indicated by the received location information and the location of said image forming apparatus are not identical to each other.

2. An image forming apparatus according to claim 1, wherein said transmission unit transmits the service information, if the received location information is identical to information indicating the location of said image forming apparatus stored in said image forming apparatus.

3. An image forming apparatus according to claim 1, wherein the location information indicates the location of the other device on a floor in a building.

4. A controlling method performed by an image forming apparatus connected to a network, the method comprising:
    a reception step of receiving service information provided by a second image forming apparatus which includes location information indicating a location of the second image forming apparatus registered in a server apparatus;
    a determination step of determining whether the location of the second image forming apparatus and a location of said image forming apparatus are identical to each other, based on the location information received in said reception step; and
    a transmission step of transmitting, via the network, without waiting for a request from the server, the service information received in said reception step and service information indicating a service that the image forming apparatus can provide to the server apparatus such that the service information for the second image forming apparatus and the service information for the image forming apparatus are related with each other and registered in the server apparatus, if the location of the second image forming apparatus indicated by the received location information and the location of the image forming apparatus are determined in said determination step to be identical to each other,
    wherein said transmission step does not include transmitting, via the network, the service information received and the service information indicating the service, if the location of the second image forming apparatus indicated by the received location information and the location of the image forming apparatus are determined in said determination step not to be identical to each other.

5. A controlling method according to claim 4, wherein said transmission step includes transmitting the service information, if the received location information is identical to information indicating the location of the network device stored in the image forming apparatus.

6. A controlling method according to claim 4, wherein the location information indicates the location of the other image forming apparatus on a floor in a building.

7. A computer memory medium storing a program for controlling an image forming apparatus connected to a network, wherein said program is executable by a computer to perform a method comprising the steps of:
    a reception step of receiving service information provided by the image forming apparatus which includes location information indicating a location of the second image forming apparatus registered in a server apparatus;
    a determination step of determining whether the location of the second image forming apparatus and a location of said image forming apparatus are identical to each other, based on the location information received by said reception unit; and
    a transmission step of transmitting, via the network, without waiting for a request from the server, the service information received in said reception step and service information indicating a service that the image forming apparatus can provide to the server apparatus such that the service information for the second image forming apparatus and the service information for the image forming apparatus are related with each other and registered in the server apparatus, if the location of the second image forming apparatus indicated by the received location information and the location of the image forming apparatus are determined in said determination step to be identical to each other,
    wherein said transmission step does not include transmitting, via the network, the service information received and the service information indicating the service, if the location of the second image forming apparatus indicated by the received location information and the location of the image forming apparatus are determined in said determination step not to be identical to each other.

* * * * *